United States Patent [19]

Rohde et al.

[11] 4,397,176

[45] Aug. 9, 1983

[54] INTERNAL COMBUSTION ENGINE KNOCKING SENSOR ARRANGEMENT

[75] Inventors: Siegfried Rohde, Schwieberdingen; Jörg Bonitz, Mühlacker; Robert Entenmann, Benningen; Rochus Knab, Kornwestheim; Herbert Schramm, Stuttgart; Günther Schmidt, Ludwigsburg, all of Fed. Rep. of Germany

[73] Assignee: Robert Bosch GmbH, Stuttgart, Fed. Rep. of Germany

[21] Appl. No.: 237,106

[22] Filed: Feb. 23, 1981

[30] Foreign Application Priority Data

Feb. 22, 1980 [DE] Fed. Rep. of Germany ....... 3006603

[51] Int. Cl.³ .............................................. G01L 23/22
[52] U.S. Cl. ......................................... 73/35; 374/144
[58] Field of Search ................... 73/35, 346; 123/425, 123/435; 340/57; 374/144

[56] References Cited

U.S. PATENT DOCUMENTS 1,902,932  3/1933  Zubaty ................................ 73/346
3,089,474  5/1963  Lewis et al. ...................... 123/425 X
3,942,359  3/1976  Arrigoni et al. ......................... 73/35
4,265,205  5/1981  Garcea ................................. 73/35 X Primary Examiner—James J. Gill
Attorney, Agent, or Firm—Frishauf, Holtz, Goodman & Woodward

[57] ABSTRACT

One or more temperature sensing elements, for example thermo couples (13, 14, 16, 17), NTC or PTC or resistance wires (18) or capillary fluid temperature sensor elements (20, 21) are located on or in the immediate vicinity of a portion of the inner wall of the combustion chamber, for example and preferably by being integrated within a head liner or facing (15, 15') of the cylinder head gasket or seal (10). The output signals, in electrical or hydraulic form are connected to an evaluation stage (E, E') which determines if the temperature within the cylinder, representative of knocking, has exceeded a predetermined level. Preferably, a speed signal (n) is derived from the engine so that the signals from the sensing elements can be strobed with respect to the time within the engine cycle during which ignition may or is intended to occur so that temperature variations due to normal engine operating strokes are eliminated from the systems output.

20 Claims, 10 Drawing Figures

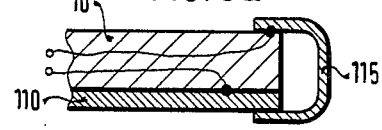
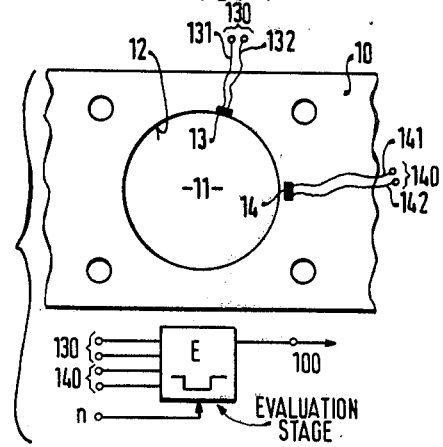
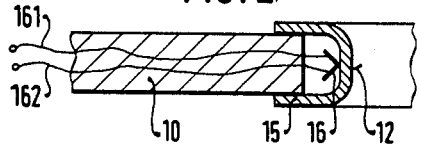
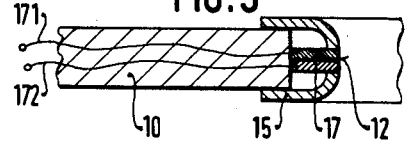
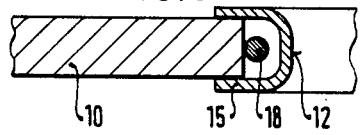
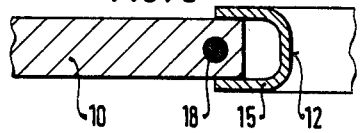
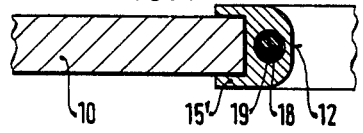
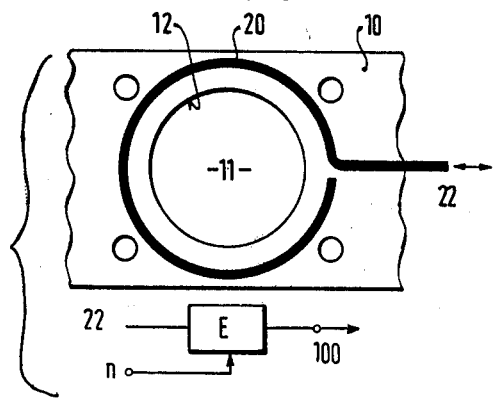
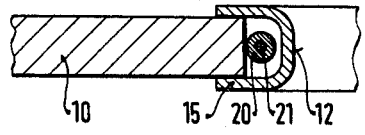

INTERNAL COMBUSTION ENGINE KNOCKING SENSOR ARRANGEMENT

Reference to related application: U.S. Ser. No. 06/003,811, filed Jan. 16, 1979, GAST, now U.S. Pat. No. 4,275,586, filed June 30, 1981 assigned to the assignee of this application.

The present invention relates to a sensor and sensor arrangement for combination with an internal combustion engine to sense knocking of the engine.

BACKGROUND

Internal combustion engines are subject to knocking under certain operating conditions. Knocking, as usually understood, is defined as a spontaneous combustion, in the form of a pulse wave or shock wave within the cylinder, resulting in substantial pressure oscillations within the cylinder and high temperatures at the surfaces of the walls of the piston and cylinder facing the combustion chamber. The wall surfaces are thermally overloaded, which is dangerous and damaging thereto. Knocking, thus, should be avoided wherever possible. Knocking results in material removal from the wall surfaces, thus damaging the surfaces; this damaging material removal particularly occurs at the surfaces of the piston, the piston rings, the cylinder surface exposed to the combustion temperature, and the cylinder head seal, for example a cylinder head gasket. Upon increase of occurrence of knocking, and its intensity, the consequent material removal and other damage, including heat stresses, eventually leads to overall damage of the engine and may lead to its destruction.

It is desirable to operate internal combustion engines at the limit of their operating capability and efficiency. It is thus important to operate the combustion engine just below the knocking level, that is, with ignition timing and fuel supply such that the maximum combustion effectiveness of the chamber can be utilized without, however, resulting in premature or uncontrolled combustion which has knocking as a consequence. It is thus desirable to provide a sensing arrangement which early and reliably indicates any knocking phenomena before they can build up to destructive levels.

Various types of sensor arrangements have been proposed; some of those sensor arrangements which are known utilize occurrence of audio frequency oscillations as a sensing parameter, which occurs upon engine knocking. The audio frequency oscillations are mechanically sensed and converted into electrical signals, for example by using piezoelectrical pressure sensors located in a special bore in the cylinder head of the internal combustion engine, or attached to a component which transfers such oscillations. A sensing arrangement of this type is described, for example, in the referenced application Ser. No. 06/003,811, filed Jan. 16, 1979, GAST, now U.S. Pat. No. 4,275,586.

Sensors which respond to mechanical oscillations occurring within the cylinder head are capable of reliably indicating engine knocking. Since these sensors respond to mechanical oscillations, however, they will also respond to oscillations which are induced not only by knocking, but are derived from the operation of the vehicle as such, for example jolts or impacts on the vehicle due to road conditions. Thus, such sensors may indicate knocking when actually no knocking occurs since the sensor responded to a spurious oscillation. The parameter which is being measured, namely oscillation due to knocking, is transduced from a mechanical parameter into an electrical signal having an indicating parameter representative of knocking.

THE INVENTION

It is an object to provide an internal combustion engine knocking sensor arrangement which is reliable, simple, inexpensive, and indicates when knocking occurs, or is about to occur, and which is not affected by external mechanical jolts applied to the engine or to a vehicle in which it is mounted.

Briefly, a temperature sensing element is located in the wall of at least one of the cylinders of the engine and provides an output signal responsive to temperature in the vicinity of the engine cylinder wall. The temperature sensing element may be a thermo couple or the like, a resistance wire, or a capillary tube having a liquid trapped therein which expands with increase in temperature. The sensor element is connected to conduct a signal representative of the sensed temperature to the outside of the cylinder, for evaluation in an evaluation stage which is responsive to and controlled by the output signal and provides an indication when the temperature in the vicinity of the cylinder wall, or of the cylinder wall, exceeds a predetermined limit.

In accordance with a feature of the invention, the sensing element may be located within the cylinder head seal or gasket of the internal combustion (IC) engine, for example by being included in or connected to a metal facing or lining of the cylinder gasket. It may be located in a hollow portion thereof, welded thereto, or otherwise so inserted that the sensing element is flush with the wall of the combustion chamber. Thermo couples, negative temperature coefficient or positive temperature coefficient resistors or resistance wires may be used; if a resistance wire, it can be located within a ring-shaped portion of the cylinder seal facing the combustion chamber. The connecting lines to electrical sensing elements preferably are loosely located within the gasket and placed in undulating or wave shape to permit some movement of the wires and seal with respect to each other, and provide for free compensation of thermal contraction/expansion. The evaluation stage preferably includes a strobe stage which is connected to receive an engine speed signal to disable sensing during times of the engine stroke cycle when combustion is not taking place so that wide variations in instantaneous engine wall temperature due to the respective strokes within an operating cycle of the engine are effectively eliminated from the temperature response circuitry itself.

The sensing arrangement has the advantage that knocking is sensed immediately at those positions of the engine which are most subject to damage, namely in the wall surrounding or defining the combustion chamber. Overheating of the engine, and especially of localized areas of the cylinder wall defining the combustion chamber, can thus be reliably sensed and avoided. The sensing arrangement does not respond to mechanical changes, such as jolts, vibrations or the like, and can provide, directly, electrical or hydraulic or pneumatic output signals which are representative of the occurrence of engine knocking. The sensor, additionally, can be used to provide a signal representative of overall engine temperature at the point of highest thermal loading. The signals can be directly applied to indicators and/or control elements of the IC engine, for example to slightly retard the spark of an external ignition IC engine upon sensing of even the slightest degree of knocking by utilizing the output signal for direct mechanical or electronic control of a spark advance/retardation element.

DRAWINGS

FIG. 1 is a highly schematic top view of a cylinder head seal or gasket with temperature sensing sensor elements therein;

FIGS. 2 and 3 are fragmentary cross-sectional views through the gasket or seal and illustrating two different ways of locating thermo couple elements in the gasket;

FIG. 3a is a highly schematic fragmentary cross section through a cylinder head liner and illustrating another embodiment;

FIG. 4 is a top view of a cylinder gasket with a resistance wire ring;

FIGS. 5 to 7 are fragmentary vertical cross-sectional views illustrating arrangements to locate a resistance wire within the gasket;

FIG. 8 is a schematic top view of a temperature sensing element incorporated in a cylinder head gasket using a capillary tube; and FIG. 9 is a fragmentary sectional side view illustrating the arrangement of a capillary sensing tube in a cylinder head seal.

A cylinder head seal 10—see FIG. 1—is formed with an opening 11 for the combustion chamber of the IC engine. A wall portion 12 of the cylinder head seal 10 faces the combustion chamber. Two temperature sensing elements 13, 14 are located at the inside of the wall 12, having electrical connections 131, 132; 141, 142, respectively, leading through the gasket 10. The temperature sensing element 13 is directly located on the wall 12 of the seal 10 which faces the combustion chamber; the temperature sensing element 14 is slightly spaced therefrom, that is, is located in the immediate vicinity of the wall 12. The heat transfer characteristics of the cylinder head seal 10, as well as the expected deterioration of the wall 12 under use of the engine, will determine whether the temperature sensing element 13 is directly applied to the inside of the wall 12, or is slightly spaced therefrom. Utilizing several temperature sensors which are locally distributed around the circumference of the cylinder opening permits determination and evaluation of spatial distribution of the heat occurring during engine knocking. In accordance with a feature of the invention the connecting lines 131, 132; 141, 142 are conducted through the remainder of the cylinder head gasket 10 in undulating or wave form in order to reduce any mechanical loading on the connecting lines upon thermal expansion of the cylinder head seal 10. The terminals 130, 140 of the connecting lines to the sensors are conducted to an evaluation stage E which receives speed signals n from a suitable revolution sensing transducer sensing rotation of the engine crankshaft and providing signals to the evaluation stage representative of angular position of the piston in the respective cylinder so that the signals from the sensors 13, 14 can be strobed, as schematically shown by the pulse representation within the evaluation stage E. The evaluation stage E thus senses the signals from the sensors 13, 14 only at a time when engine knocking can be expected, that is, when the cylinder is approaching top dead center (TDC) position in advance of the power stroke, and shortly thereafter. The output from evaluation stage E is available at a terminal 100. The evaluation stage may, additionally, include a threshold circuit which provides an output signal at terminal 100 only if the temperature sensed by the respective sensors 13, 14 . . . exceeds a predetermined level.

The sensors can also be used to, directly, indicate engine temperature by integrating the output signal from the sensors over a period of time and using the so obtained integrated signal as a measure of average engine temperature.

In accordance with a feature of the invention, the sensor elements are thermo couples. FIG. 2 illustrates a preferred form of a thermo couple arrangement in which a cylinder head seal or gasket 10 has a metal facing 15, on the inside of which a thermo couple 16 is attached, preferably by welding. The thermo couple may, however, also be integrated into an opening formed in the cylinder head facing or liner 15 as such, as shown in FIG. 3, where a thermo couple 17 forms an integral component of the metal facing or liner 15. The thermo couple terminates flush with the wall 12 facing the combustion chamber. The respective connecting lines 161, 162 (FIG. 2) and 171, 172 (FIG. 3) of the thermo elements 16, 17 again are carried through the cylinder head seal 10 in undulating or wave form.

The temperature sensing element, utilizing a thermo couple, can also be constructed in a manner such that the metal facing 15 itself forms one of the metallic elements of the thermo couple, the other metallic element or leg thereof then being formed by a metal facing of the cylinder head seal 10 itself. Such an arrangement is shown in FIG. 3a, in highly schematic form, in which the metal facing 110 on the cylinder head liner 10 is of a metal which differs from the facing 115 applied over the end surface. The facing 115, and the surface liner 110, each, are connected to respective connection lines, carried through the liner 10 in undulating or wave form.

Rather than using thermo couples, negative temperature coefficient (NTC) or positive temperature coefficient (PTC) resistance elements may be used which, depending on their construction, can be applied directly on the inside of the facing 15 similar to the placement of the thermo couple in FIG. 2, or to extend through the facing 15 to be flush with the inner wall 12 thereof.

FIG. 4 illustrates an arrangement in which the cylinder head seal 10 has a ring-shaped resistance wire 18 embedded therein, surrounding the opening 11 defining the combustion chamber. The connecting lines 181, 182, again, are in wave or undulating form.

The sensors 13, 14; 16, 17 provide, essentially, for point source temperature evaluation; the sensor of FIGS. 3a and 4, however, provides for integral sensing of the temperature condition of the combustion chamber distributed over the entire circumference of the wall surface 12 thereof.

The resistance wire 18 can be applied in various ways, see FIGS. 5 to 7: Resistance wire 18 can be located at the outer surface of the cylinder head seal 10—see FIG. 5—spaced from the inner surface of the head liner or facing 15. It is also possible to locate the resistance wire 18 entirely within the cylinder head seal 10—see FIG. 6. The resistance wire 18 can also be placed within a solid metal liner 15' (FIG. 7) with a high-temperature insulation 19 interposed between the wire 18 and the liner 15'. The type of application of the resistance wire in or on the cylinder head gasket or seal 10 will depend on the thermal transition characteristics of the respective materials, costs of materials, and manufacturing costs.

FIGS. 1 to 7 illustrate arrangements in which the sensing was done electrically, and the output signal was an electrical output signal. The temperature of the cylinder wall, or the area immediately adjacent thereto, can also be sensed by determining change in volume upon temperature variation. FIGS. 8 and 9 illustrate such an arrangement in which a capillary tube 20 is located in or on the cylinder head seal gasket 10 to sense temperature within the combustion chamber 11 by change in volume of a liquid 21 within the capillary tube 20. The sensing signal is obtained at an outlet 22 of the capillary 20, applied to an evaluation stage E' to which, preferably, a speed signal n from the engine is also applied, to derive an output 100'. This output can be directly used to control positioning of an ignition advance element, for example. A practical arrangement for attachment of the capillary 20 is shown in FIG. 9, in which the capillary is located within the metal liner 15 of the cylinder head seal 10, similar to the resistance wire 18 (FIG. 5). The capillary 20 may be in contact with the cylinder head liner 15, or out of contact as shown.

The temperature which is being measured at the combustion wall 12 of the cylinder head liner is subject to high periodic variations due to the different strokes in an Otto motor - type IC engine. These variations can be smoothed or eliminated from sensing by various well known and standard electronic switching devices, connected to the temperature sensing elements and forming part of the evaluation stage E, or E', respectively, and which include a strobe stage, coupled to and controlled by an engine speed sensor, responsive to a speed signal applied to terminal n. The periodic variations of temperature which normally occur in synchronism with the respective strokes of the engine cycle, in operation, thus can be eliminated from sensing consideration. Such a strobing circuit may, for example, be merely a transistor circuit which short-circuits the output from the respective sensing elements 13, 14, 16 ... during the time when combustion is not expected or possible; or a "sample and hold" circuit which has a sampling rate dependent on engine speed and providing for sampling for the period of time within the engine cycle when knocking may occur.

Various changes and modifications may be made, and features described in connection with any one of the embodiments may be used with any of the others, within the scope of the inventive concept.

The decision as to which one of the various embodiments which have been described is to be the best one for any particular application will depend on engineering and economic criteria. Thus, for small engines operating, generally, at an average lower temperature, and utilizing metals which can readily be welded, the embodiment of FIG. 2 is suitable; the embodiment of FIG. 3a is suitable if the metals for the surface liner 110 and for the facing 115 are inexpensive and can be readily connected to connecting leads, without introducing stresses or causing possible breaks. The embodiment of FIG. 5 or FIG. 6 is particularly suitable if the liners are made by molding techniques; the embodiment of FIGS. 8 and 9 is particularly suitable if the output signal at line 22 can be used for direct application to control, for example, a vacuum spark advance diaphragm into retarding direction if an excessive temperature is sensed. Use of a plurality of thermo couples as shown in FIG. 1, for example, may be desirable in larger engines where spatial distribution of combustion pressure shock waves, resulting in localized excessive temperature levels, are to be determined, for example in connection with engines under test.

Suitable metals for the surface liner 110 and the face liner 115, FIG. 3a are: nickel/chrome nickel, platinum/platinum rhodium, and iron/constantan.

We claim:

1. For combination with an internal combustion engine having at least one cylinder defining a combustion chamber and a cylinder head seal, sealing the cylinder head,
an engine knock sensor having
a temperature sensing element located in the wall of the at least one cylinder, and providing an output signal representative of temperature at, or in the vicinity of the engine cylinder wall;
connection means connected to the sensing element and conducting said output signal externally of the cylinder;
and an evaluation stage (E, E') connected to said connection means and responsive to and controlled by the output signal and providing an indication when the temperature of the cylinder wall exceeds a predetermined limit,
wherein the temperature sensing element is a thermo couple (16, 17);
the cylinder head seal includes
a metal liner (15);
and the thermo couple is welded to the metal liner.

2. Sensor according to claim 1, including a head seal or gasket supporting said sensing element and said connection means;
and wherein said connection means comprise connecting wire lines which are placed in or on said seal or gasket in undulating or wave form to provide for stress-free connection to said evaluation stage under conditions of differential thermal expansion of the liner and said head seal or gasket.

3. For combination with an internal combustion engine having at least one cylinder defining a combustion chamber and a cylinder head seal, sealing the cylinder head,
an engine knock sensor having
a temperature sensing element located in the wall of the at least one cylinder, and providing an output signal representative of temperature at, or in the vicinity of the engine cylinder wall;
connection means connected to the sensing element and conducting said output signal externally of the cylinder;
and an evaluation stage (E, E') connected to said connection means and responsive to and controlled by the output signal and providing an indication when the temperature of the cylinder wall exceeds a predetermined limit,
wherein the temperature sensing element is a thermo couple (16, 17);
the cylinder head seal includes
a metal liner (15);
and the thermo couple is secured to the wall surface (12) of the metal liner (15) facing the combustion chamber and flush therewith.

4. Sensor according to claim 3, including a head seal or gasket supporting said sensing element and said connection means;
and wherein said connection means comprise connecting wire lines which are placed in or on said seal or gasket in undulating or wave form to provide for stress-free connection to said evaluation stage under conditions of differential thermal expansion of the liner and said head seal or gasket.

5. For combination with an internal combustion engine having at least one cylinder defining a combustion chamber and a cylinder head seal, sealing the cylinder head,
an engine knock sensor having
a temperature sensing element located in the wall of the at least one cylinder, and providing an output signal representative of temperature at, or in the vicinity of the engine cylinder wall;
connection means connected to the sensing element and conducting said output signal externally of the cylinder;
and an evaluation stage (E, E') connected to said connection means and responsive to and controlled by the output signal and providing an indication when the temperature of the cylinder wall exceeds a predetermined limit,
wherein the temperature sensing element is a thermo couple (16, 17);
the cylinder head seal includes
a cylinder head gasket having a metal facing or liner (15, 110), said metal facing or liner forming one element of the thermo couple.

6. Sensor according to claim 5, including a head seal or gasket supporting said sensing element and said connection means;
and wherein said connection means comprise connecting wire lines which are placed in or on said seal or gasket in undulating or wave form to provide for stress-free connection to said evaluation stage under conditions of differential thermal expansion of the liner and said head seal or gasket.

7. Sensor according to claim 5, wherein the gasket comprises the combination of a non-metallic element (10) and a metal surface liner (110);
and the edge facing (115) is applied to the edge of the non-metallic element liner combination, the edge facing being exposed to the combustion chamber (11) of the engine,
said surface liner (110) and said edge facing (115) being of different metals and forming the thermo couple and being, respectively, connected to said connection means.

8. For combination with an internal combustion engine having at least one cylinder defining a combustion chamber and a cylinder head seal, sealing the cylinder head,
an engine knock sensor having
a temperature sensing element located in the wall of the at least one cylinder, and providing an output signal representative of temperature at, or in the vicinity of the engine cylinder wall;
connection means connected to the sensing element and conducting said output signal externally of the cylinder;
an an evaluation stage (E, E') connected to said connection means and responsive to and controlled by the output signal and providing an indication when the temperature of the cylinder wall exceeds a predetermined limit,
wherein the sensing element comprises an electrical resistance wire element (18) having a temperature coefficient of resistance other than unity, secured to the cylinder head seal, in thermal sensing relation to the cylinder head wall and is positioned adjacent the edge of the cylinder head seal which faces the cylinder head wall at the side of the combustion chamber.

9. Sensor according to claim 8, including a head seal or gasket supporting said sensing element and said connection means;
and wherein said connection means comprise connecting wire lines which are placed in or on said seal or gasket in undulating or wave form to provide for stress-free connection to said evaluation stage under conditions of differential thermal expansion of the liner and said head seal or gasket.

10. Sensor according to claim 8, wherein said cylinder head seal (10) includes
a cylinder head gasket (10), said resistance element (18) being embedded within said cylinder head gasket.

11. Sensor according to claim 8, wherein said cylinder head seal (10) includes a metal liner (15);
and said resistance wire element (18) is located within said cylinder head seal facing and in thermal sensing relation with respect to the temperature thereof.

12. Sensor according to claim 8, wherein said cylinder head seal (10) includes a metal facing liner (15) which is positioned to face the combustion chamber (11) of the engine;
and wherein said resistance wire element is secured in said liner (15) flush with the wall surface (12) of said liner facing the combustion chamber.

13. Sensor according to claim 8, wherein said resistance wire element (18) is positioned in circular or ring form surrounding the combustion chamber of the engine.

14. Sensor according to claim 8, wherein the cylinder head seal (10) includes a solid gasket element (10) and a hollow metal facing or liner (15) surrounding, with clearance space, the edge of the solid gasket element;
and said resistance wire element (18) is located within the clearance space.

15. Sensor according to claim 8, wherein said cylinder head seal (10) includes a solid gasket element (10) and a solid metal facing or liner (15');
and said resistance wire element (18) is embedded in said solid metal facing or liner.

16. For combination with an internal combustion engine having at least one cylinder defining a combustion chamber and a cylinder head seal, sealing the cylinder head,
an engine knock sensor having
a temperature sensing element located in the wall of the at least one cylinder, and providing an output signal representative of temperature at, or in the vicinity of the engine cylinder wall;
connection means connected to the sensing element and conducting said output signal externally of the cylinder;
and an evaluation stage (E, E') connected to said connection means and responsive to and controlled by the output signal and providing an indication when the temperature of the cylinder wall exceeds a predetermined limit,
wherein the temperature sensing element comprises a capillary tube enclosing a temperature sensitive liquid, the capillary tube surrounding the combustion chamber (11) in ring form.

17. Sensor according to claim 16, including a head seal or gasket supporting said sensing element and said connection means;

and wherein said connection means are placed in or on said seal or gasket in undulating or wave form to provide for stress-free connection to said evaluation stage under conditions of differential thermal expansion of the liner and said head seal or gasket.

18. For combination with an internal combustion engine having at least one cylinder defining a combustion chamber and a cylinder head seal, sealing the cylinder head, an engine knock sensor having a temperature sensing element located in the wall of the at least one cylinder, and providing an output signal representative of temperature at, or in the vicinity of the engine cylinder wall;

connection means connected to the sensing element and conducting said output signal externally of the cylinder;

and an evaluation stage (E, E') connected to said connection means and responsive to and controlled by the output signal and providing an indication when the temperature of the cylinder wall exceeds a predetermined limit, wherein the cylinder head seal (10) includes a solid gasket element (10) and a hollow metal facing or liner (15) surrounding, with clearance space, the edge of the solid gasket element;

and said temperature sensing element (16, 17; 18; 20, 21) is located within said clearance space.

19. For combination with an internal combustion engine having at least one cylinder defining a combustion chamber and a cylinder head seal, sealing the cylinder head, an engine knock sensor having a temperature sensing element located in the wall of the at least one cylinder, and providing an output signal representative of temperature at, or in the vicinity of the engine cylinder wall;

connection means connected to the sensing element and conducting said output signal externally of the cylinder;

and an evaluation stage (E, E') connected to said connection means and responsive to and controlled by the output signal and providing an indication when the temperature of the cylinder wall exceeds a predetermined limit, wherein the cylinder head seal (10) includes a solid gasket element (10) and a metal facing or liner;

and said temperature sensing element is positioned in temperature sensing relationship with said liner at a region thereof remote from the wall surface (12) of said liner facing the combustion chamber of the at least one cylinder.

20. For combination with an internal combustion engine having at least one cylinder defining a combustion chamber and a cylinder head seal, sealing the cylinder head, an engine knock sensor having a temperature sensing element located in the wall of the at least one cylinder, and providing an output signal representative of temperature at, or in the vicinity of the engine cylinder wall;

connection means connected to the sensing element and conducting said output signal externally of the cylinder;

and an evaluation stage (E, E') connected to said connection means and responsive to and controlled by the output signal and providing an indication when the temperature of the cylinder wall exceeds a predetermined limit, wherein the cylinder head seal (10) includes a gasket element (10);

and the temperature sensing element is embedded within said gasket element in a region in the vicinity of the combustion chamber of the at least one cylinder.

* * * * *